(12) United States Patent
Fust et al.

(10) Patent No.: US 10,229,795 B2
(45) Date of Patent: Mar. 12, 2019

(54) OPERATING UNIT FOR AN ELECTRICAL APPARATUS

(71) Applicant: Behr-Hella Thermocontrol GmbH, Stuttgart (DE)

(72) Inventors: Winfried Fust, Lippstadt (DE); Michael Steinkamp, Lippstadt (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 31 days.

(21) Appl. No.: 15/327,452

(22) PCT Filed: Jul. 10, 2015

(86) PCT No.: PCT/EP2015/065843
§ 371 (c)(1),
(2) Date: Jan. 19, 2017

(87) PCT Pub. No.: WO2016/012277
PCT Pub. Date: Jan. 28, 2016

(65) Prior Publication Data
US 2017/0148587 A1   May 25, 2017

(30) Foreign Application Priority Data
Jul. 22, 2014   (DE) .................. 10 2014 214 262

(51) Int. Cl.
*H01H 13/10*   (2006.01)
*G05G 1/02*   (2006.01)
(Continued)

(52) U.S. Cl.
CPC ........... *H01H 13/10* (2013.01); *B60H 1/0065* (2013.01); *B60K 35/00* (2013.01); *B60K 37/06* (2013.01);
(Continued)

(58) Field of Classification Search
CPC ........ G06F 3/044; G06F 3/0362; G06F 3/016; H01H 13/10; H01H 13/14;
(Continued)

(56) References Cited

U.S. PATENT DOCUMENTS

| | | |
|---|---|---|
| 2006/0256075 A1 | 11/2006 | Anastas et al. |
| 2010/0149111 A1 | 6/2010 | Olien |
| 2011/0291947 A1 | 12/2011 | Pemberton-Pigott |
| 2011/0291975 A1 | 12/2011 | Dietz et al. |
| 2014/0207268 A1 | 7/2014 | Gutermuth et al. |

FOREIGN PATENT DOCUMENTS

| | | |
|---|---|---|
| DE | 10 2008 058 568 A1 | 5/2010 |
| DE | 10 2011 106 051 A | 1/2013 |
| DE | 10 2011 082 143 A1 | 3/2013 |

OTHER PUBLICATIONS

International Search Report and Written Opinion for corresponding Patent Application No. PCT/EP2015/065843 dated Dec. 22, 2015.

*Primary Examiner* — Ahmed Saeed
(74) *Attorney, Agent, or Firm* — Renner, Otto, Boisselle & Sklar LLP

(57) ABSTRACT

The operating unit (10) for an electrical appliance, in particular a vehicle component such as a heating, ventilation and/or air conditioning system, is provided with an operating element (16) which can be pressed down in a direction of actuation (28), and a support element (24) which is mechanically coupled to the operating element (16) and on which the operating element (16) is elastically supported so as to be movable in the direction of actuation (28). The operating element (10) further comprises a sensor (30) for detecting the motion of the operating element (16) when the latter is pressed down, and/or for detecting a force applied to the operating element (16), an actuator (36) for moving the support element (24) and the operating element (16) coupled thereto, and an evaluation and drive unit (34)

(Continued)

Figure 1:
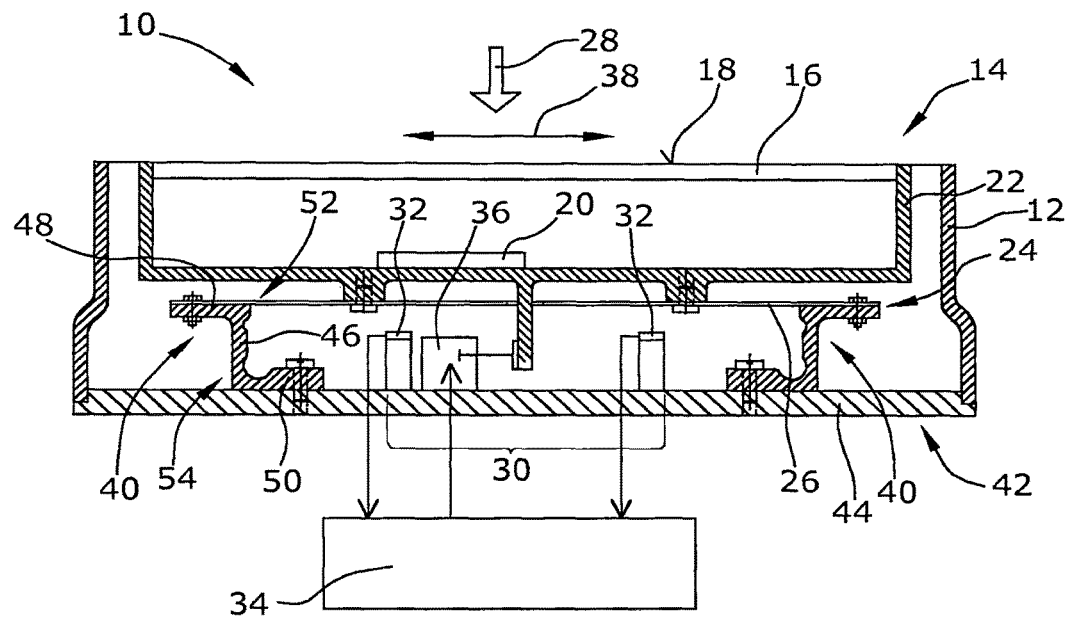

connected to the sensor (30) and to the actuator (36) for driving the actuator (36) when the sensor (30) detects the motion of the operating element (16) as a result of the latter being pressed down, and/or a force applied to the operating element (16). The support element (24) can be moved by the actuator (36) in at least one direction of movement (38) transverse to the direction of actuation (28) of the operating element (16).

10 Claims, 3 Drawing Sheets

(51) Int. Cl.
*G05G 5/03* (2008.04)
*G06F 3/01* (2006.01)
*G06F 3/0362* (2013.01)
*B60H 1/00* (2006.01)
*H01H 13/14* (2006.01)
*B60K 35/00* (2006.01)
*B60K 37/06* (2006.01)

(52) U.S. Cl.
CPC ............... *G05G 1/02* (2013.01); *G05G 5/03* (2013.01); *G06F 3/016* (2013.01); *G06F 3/0362* (2013.01); *H01H 13/14* (2013.01); *B60K 2350/102* (2013.01); *H01H 2215/00* (2013.01); *H01H 2215/054* (2013.01); *H01H 2221/044* (2013.01); *H01H 2221/062* (2013.01)

(58) Field of Classification Search
CPC ....... H01H 2221/044; H01H 2221/062; H01H 2215/00; B60K 35/00; B60K 37/06; B60K 2350/102; B60H 1/0065; G05G 1/02; G05G 5/03
USPC .................................. 200/600; 345/173, 174
See application file for complete search history.

OPERATING UNIT FOR AN ELECTRICAL APPARATUS

The present patent application claims the priority of German Patent Application 10 2014 214 262.8 of Jul. 22, 2014, whose contents are herewith incorporated by reference into the subject matter of the present patent application.

The invention relates to an operating unit for an electrical appliance, in particular for a vehicle component such as e.g. a heating, ventilation and/or air conditioning system.

Particularly in the field of operating units for vehicle components, ever-increasing preference is given to operating concepts wherein an operating element, for being actuated, has to be pressed down merely along a relatively short path. In order to signal to the person actuating the operating unit that the operating unit has been actuated correctly in the specified manner, there is given a tactile feedback in the form of a forced vibrational movement of the operating element. Operating elements of this type are also referred to as force sense/force feedback systems because, on the one hand, they will detect the actuation force or the exceeding of a minimum actuation force and, on the other hand, they will generate a corresponding feedback by application of a force onto the operating element.

Such systems are described in DE-A-10 2011 106 051, DE-A-10 2008 058 568 and DE-A-10 2011 082 143.

A certain difficulty in the realization of such systems resides in that the support of the operating element is relatively complex. This is the case because, on the one hand, the actuation force acting on the operating element has to be captured so as to detect an actuation of the operating element and, on the other hand, the operating element has to be supported in a movable manner for performing the tactile feedback.

It is an object of the invention to provide an operating unit for an electrical appliance, in particular for a vehicle component such as e.g. a heating, ventilation and/or air conditioning system, wherein the operating unit is of a simplified mechanical design.

To achieve the above object, the invention proposes an operating unit for an electrical appliance, in particular for a vehicle component such as e.g. a heating, ventilation and/or air conditioning system, comprising an operating element which can be pressed down in a direction of actuation, a support element which is mechanically coupled to the operating element and on which the operating element is elastically supported so as to be movable in the direction of actuation, a sensor for detecting a motion of the operating element when the latter is pressed down, and/or for detecting a force applied to the operating element, an actuator for moving the operating element, and an evaluation and drive unit connected to the sensor and to the actuator for driving the actuator upon press-down movement of the operating element and/or application of force onto the operating element as detected by the sensor, the support element being adapted to be moved (particularly in an oscillating manner) by the actuator in at least one direction of movement extending transversely to the direction of actuation of the operating element.

The invention provides that, when the operating element has been actuated correctly in the specified manner, an actuator will move the operating element laterally and thus in a direction substantially orthogonal to the direction of movement. This movement can be oscillating. The operating element itself is adapted to be pressed down in the direction of actuation and is elastically supported on a support element. A sensor detects the actuation of the operating element either by position detection or by force detection. The sensor delivers its output signal to an evaluation and drive unit in which it is detected e.g. that, since a predetermined amount of the measurement signal has been reached, the operating element has been actuated correctly in the specified manner. At this moment, the actuator can move the operating element laterally, i.e. transversely to the direction of actuation. In this situation, it can be provided that the actuator will act directly onto the operating element or that it will act onto the support element which then, due to its mechanical coupling with the operating element, will take along the operating element during its lateral movement.

In essence, the concept of the invention provides that an actuation of an operating element by a (minimum) actuation force (force sense) vertically to the surface, i.e. to the operating field of the operating element, will result in a feedback of the actuation by accelerated movement of the operating element in lateral direction (force feedback), i.e. orthogonally to the effective direction of the actuation force, i.e. substantially in the extension of the operating surface of the operating element so that the actuation of the operating element is signaled to the operator in a haptic and tactile manner.

The support of the operating element is, relative to the support element, elastic in the direction of actuation and in the opposite direction, wherein this support should be rigid with respect to lateral movements of the operating element until the actuator enforces the lateral movement of the operating element. In so far, the operating unit of the invention makes use of a play-free elastic support for the operating element with force/position detection in the press-down direction of the operating element and with tactile feedback of the actuation by lateral movement of the operating element transversely to the direction of movement of the latter.

According to a further advantageous embodiment of the invention, it can be provided that the support element is supported on at least two support arms which project upward from an abutment element and are arranged in the extension of the direction of actuation of the operating element, wherein, for movement of the support element by the actuator, the support arms are each on both of their ends connected to the support element and the abutment element in a—particularly elastically—movable manner. Since the support arms via which the support element rests on an abutment element extend in the direction of actuation of the operating element, the support element is supported in a fixed manner with respect to this dimension.

It can be particularly useful if each support arm is of a Z-shaped or U-shaped design and comprises an intermediate portion arranged in the extension of the direction of actuation of the operating element, and two fastening portions each projecting from another end of the intermediate portion at a right angle thereto and, relative to each other, in identical or opposite senses, a respective one of the fastening portions being connected to the support element and the respective other one being connected to the abutment element, wherein each support arm in the corner region between the intermediate portion and each of the fastening portions is of a flexible design effected by a reduced thickness and/or width relative to the adjacent regions of these portions of the support arms. As already mentioned above, the linkage of the support element should be movable laterally but fixed in position in the direction of actuation. This is to say that the ends are connected to the support element on the one hand and to the abutment element on the other hand, i.e. that they have a certain flexibility in directions laterally to the direction of actuation. This is accomplished in a particularly simple constructional manner by the design of each support arm that includes an intermediate portion extending in the direction of actuation of the operating element wherein both ends of the intermediate portion have fastening portions extending from them, particularly at right angles to the intermediate portion.

The fastening portions can extend toward a common side of the intermediate portion so that the support arm will then substantially have a U-shape, or, on the other hand, they can project from the intermediate portion toward the opposite sides of the intermediate portion so that the support arm will then have a Z-shape. In both cases, it is important that the transition region between the intermediate portion and the fastening portion is of a flexible design so as to allow for a shear movement of the support arm, i.e. an at least slight tilting movement of the intermediate portion toward both sides. According to a preferred embodiment of the invention, this is achieved by living-hinge-like designs in the corner regions between the intermediate portion and each of the two fastening portions. Such a flexible design can be realized by a reduction of the thickness and/or width of the support arm in the corner regions or adjacent to these.

In so far, it can be of advantage if each corner region of a support arm comprises an inner surface and an outer surface, each of the inner and outer surfaces comprising respectively two mutually right-angled surface portions, wherein the inner surface and/or the outer surface comprises a groove-like recess and/or the connecting region where the two surface portions of the inner surface and/or the two surface portions of the outer surface are bordering on each other, comprises a groove-like recess, wherein the groove-like recess is arranged on the inner surface or on the outer surface, or on the outer surface and opposite to the connecting region of the inner surface.

Apart from Z- or U-shaped support elements, use can be made also of such elements that are articulated to the operating element and the abutment element, i.e. provide high stiffness in the direction of actuation and flexibility transversely thereto.

It is useful if the support arm comprises plastic material. However, also other materials can be used for the support arms as far as these materials allow for an elastic movability of the support arms in the corner regions between the intermediate portions and the fastening portions. This elasticity makes it possible that the support arms, after lateral deflection of their intermediate portions (lateral movement of the operating element as tactile feedback of an actuation of the operating element) will automatically return into their initial position in which the intermediate portions extend again in the direction of actuation of the operating element and thus guarantee the fixed support of the support element, which in turn is of advantage for the haptic behavior of the operating upon actuation of the latter (application of force in the direction) of actuation. In this connection, it can be of advantage to provide a damping element for damping the movement of the operating element caused by the actuator during the fading of this movement after deactivation of the actuator.

In the ideal case, this damping element, or also the support element which thus should have corresponding damping properties, is operative to dampen the —particularly oscillating—lateral movement of the operating element without further overshoot when the actuator is deactivated.

As a sensor for detection of the press-down of the operating element or of the application of force onto the operating element, use can be made of sensors operating in a capacitive, inductive, ohmic or optical manner. Similar options exist for the actuators which are in operative connection with the support element of the operating element e.g. in a capacitive, inductive or mechanical manner.

According to a further useful embodiment of the invention, it can be provided that the sensor comprises at least two sensor elements for detection of an actuation of the operating element and/or of an application of force onto the operating element and that, in the evaluation and drive unit, the site of an application of force onto an operating surface of the operating element for pressing down the latter can be detected on the basis of the signals delivered by the two sensor elements, or that the operating element comprises a touch-sensitive operating surface for detection of a site of a touch onto the operating element and/or of an application of force for pressing down the operating element. Thus, by any one of these two alternative solutions, it is possible to detect the site of the touch/actuation on the operating surface of the operating element. Herein, the operating surface normally comprises a plurality of operating symbols, and thus it can be automatically detected on which operating symbol there is resting e.g. the finger of a hand when the operating element is actuated.

The advantages of the operating unit according to the invention can be summarized as follows:

The spring rate with which the operating element is suspended is defined in the direction of actuation (i.e. in a direction normal to the surface and respectively the operating surface of the operating element) and, particularly, is decoupled from the elasticity of the system in lateral direction relative to the direction of actuation. The spring rate is play-free in the direction of actuation.

The spring rate in combination with a distance measurement can be used for determining the actuation force (in this regard, see e.g. German Patent Applications 10 2013 225 436.9 and 10 2013 225 463.6—both filed on Dec. 10, 2013—whose contents are herewith incorporated by reference into the subject matter of the present patent application).

An actuator will move and respectively accelerate the operating element in at least one lateral direction.

The spring rate in the direction of actuation of the actuator is defined by the shear-force-yielding support of the support element via the support arms of the latter.

Also this spring rate is play-free, notably in the effective direction of the actuator.

The support arms of the operating element will allow, in the effective direction of the actuator, for a nearly parallel movement of the operating element. The suspension is elastically resilient in the effective direction of the actuator but is relatively stiff in the direction of force application (direction of actuation) when the operating element is actuated, so that a distance measurement during the press-down of the operating element that in turn could serve for force detection, will be influenced not at all or only slightly.

The two spring rates mentioned above can be adjusted independently from each other.

Both springs can be designed to the effect that they are relaxed in their rest position.

The movement of the operating element by the actuator can be dampened by a damping element.

The movement effected by the actuator can be dampened in the direction of movement by use of a damping material for the suspension.

Figure 2:
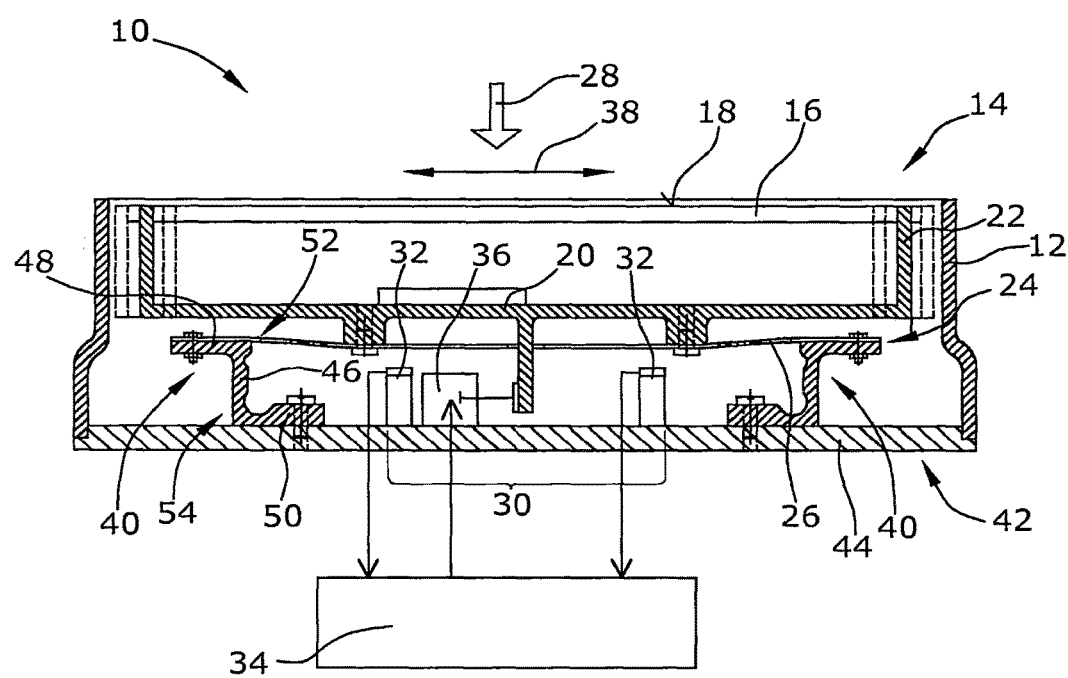
Figure 3:
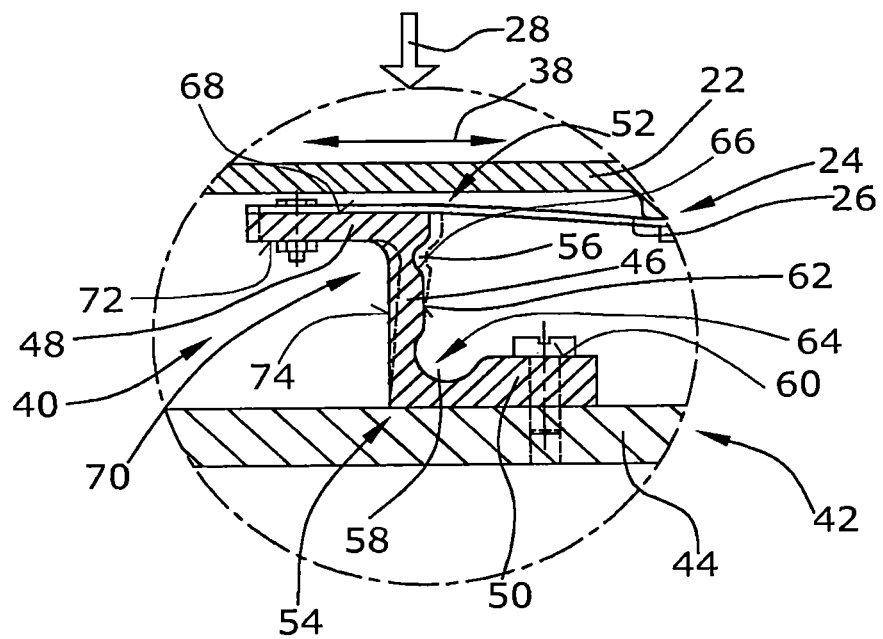
Figure 4:
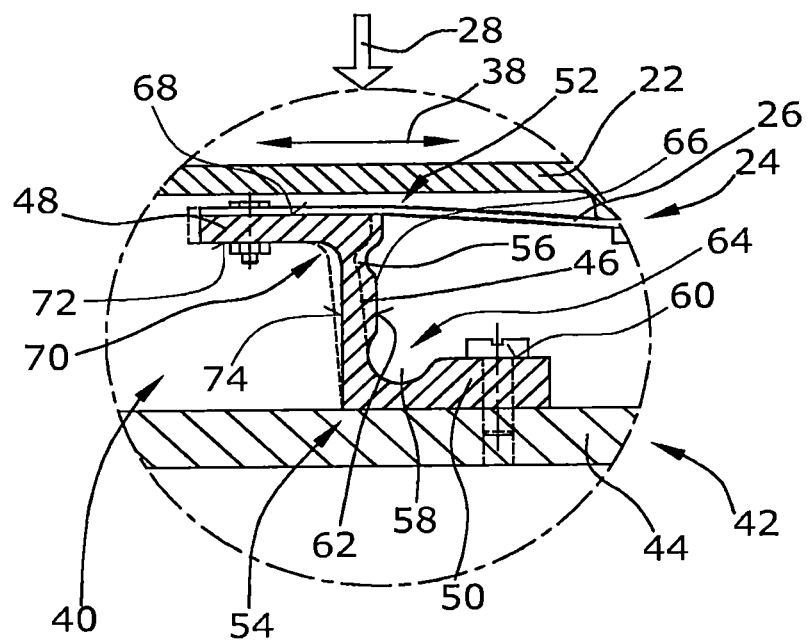
Figure 5:
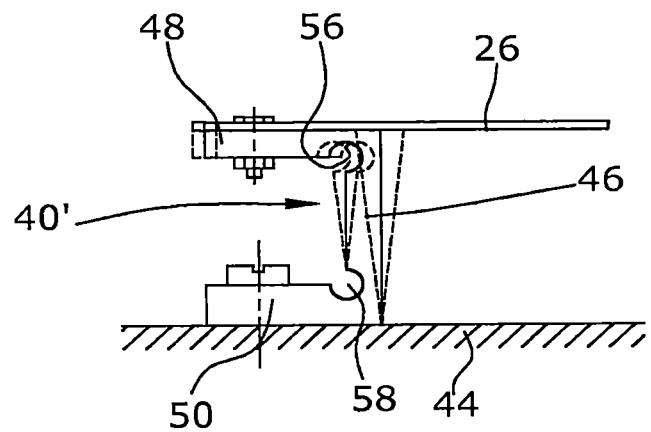
Figure 6:
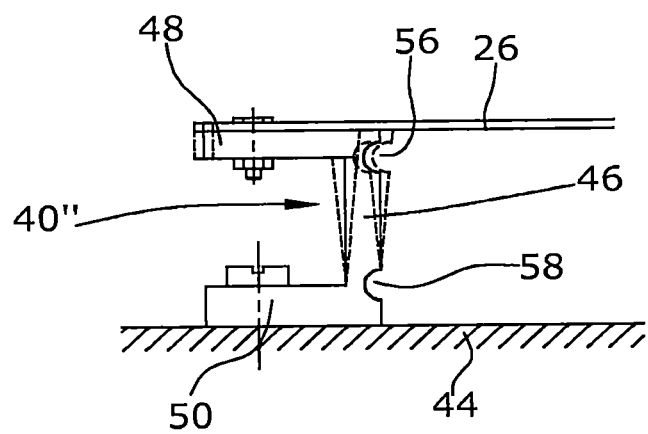

The invention will be explained in greater detail hereunder by way a several exemplary embodiments thereof and with reference to the drawings. In the individual Figures, the following is shown:

FIG. 1 shows a sectional view of the configuration of an operating unit comprising an operating element which is adapted to be pressed down, is supported in a defined manner and is movable, particularly in an oscillating manner, transversely to the press-down movement, the operating element being shown in the non-actuated state, FIG. 2 shows the operating element according to FIG. 1 in the actuated state, FIGS. 3 and 4 show enlarged views of the special support arms—in this embodiment being Z-shaped—which have high stiffness upon application of force in the direction of actuation and flexibility/elasticity upon application of shear forces transversely to the direction of actuation, and FIGS. 5 and 6 show enlarged views of a further exemplary embodiment of the support arms of a substantially U-shaped design.

Before discussing the exemplary embodiments according to FIGS. 1 to 6, a few brief general explanations should be given on the functional and constructional principles of the operating unit.

The operating unit is provided with at least one operating element which is elastically supported on or at a support element in the direction of actuation. When, now, an actuation force is applied onto the operating element, the operating element will yield in correspondence to the spring rate of its suspension (spring-elastic support on/in the support element). If this spring rate and possibly the site of the application of force is known, it is possible, on the basis of the resulting displacement of the operating element, to detect the applied actuation force.

After detection of a sufficiently large minimum actuation force or a sufficiently large stroke, an actuator can be activated that will displace the operating element transversely to the direction of actuation, i.e. laterally. The movement effected by the actuator is guided with the aid of support arms or the like guide elements in such a manner that the operating element, which undergoes only small deflections, will perform a substantially parallel movement. This minimal movement will be perceived by the user as a haptic/tactile feedback of the actuation of the operating element.

As shown in FIG. 1, the operating unit 10 comprises a housing 12 on whose top side 14 there is arranged an operating element 16 having an operating field with a plurality of symbols. The operating element 16 comprises e.g. a touch-type sensorics system (not shown) which makes it possible to detect the site of the touch onto the operating field 18. The electronics required for this purpose is schematically shown at 20 and, in the present embodiment, is arranged within an operating element housing 22. The operating element 16 is connected to a support element 24 which, in the present embodiment, is designed as a plate element 26 made of spring steel. Thereby, when an actuation force is applied in the direction of actuation (see arrow 28), the operating element 16 is supported in a resiliently elastic manner, Via a sensor 30 which in the present exemplary embodiment comprises two sensor elements 32, it is possible to detect the stroke by which the operating element 16 is moved upon actuation in the direction of actuation 28. The sensors are connected to an evaluation and drive unit 34.

This evaluation and drive unit is operative to drive, inter alia, an actuator 36 for lateral—particularly oscillating—movement in the directions indicated by the double arrow 38. Upon detection of a correct actuation of the operating element 16 by the senor 30 and the evaluation and drive unit 34, the actuator 36, which in the present exemplary embodiment is mechanically coupled to the housing 22 of operating element 16, will be actuated whereby both the operating element 16 and its support element 26 will be moved laterally and thus in a laterally oscillating manner.

The in so far conflicting requirements of a rigid support of the support element 24 in the direction of actuation 28 and of a flexibility of this support in lateral direction (double arrow 38) are realized, in this exemplary embodiment, by specially designed support arms 40 via which the support element 24 rests on an abutment element 42. In this exemplary embodiment, the abutment element is the bottom wall 44 of the housing 12 of operating unit 10.

As evident from FIGS. 1 to 4, each support arm 40 is substantially Z-shaped and is provided with an intermediate portion 46 extending in the direction of actuation 28, and with two fastening portions 48,50. These fastening portions 48,50 project, toward mutually opposite sides, at right angles from the upper and lower ends of the intermediate portion. By the intermediate portions 46 extending in the direction of actuation 28, the support element 24 is given high stiffness regarding its support upon application of force in the direction of actuation 28.

Now, to make it possible for these support arms 40 to allow for a lateral movement of the support element 24 and thus of the operating element 16, it is provided that, in the corner regions 52,54 between respectively the fastening portions 48,50 and the respective intermediate portion 46, the support arms are flexible and elastic. The fastening portions 48,50 are tightly connected on the one hand to the support element 24 (i.e. said plate element 26 made of spring steel) and, on the other hand, to the abutment element 42, i.e. to the bottom wall 44. The elasticity of these support arms 40 upon application of shear forces as caused by the actuator 36 is realized in that the support arms 40 are designed in the manner of living hinges on their corner regions 52,54. The reduction of thickness of the support arms 40 in the corner regions 52,54 that is required for this purpose, is realized by grooves (i.e. groove-like recesses) 56,58 as shown in FIGS. 1 to 4. The living hinges formed in this manner have a restoring capability which has the effect that, after deactivation of actuator 36, the support arms 40 will automatically return into their initial positions according to FIG. 1 in which their intermediate portions 46 extend in the direction of actuation 28.

As can be seen particularly in FIGS. 3 and 4, the support arms 40 allow for a certain flexibility and elasticity in the direction 38 of the (e.g. oscillatory) movement of operating element 16 upon feedback of an actuation. The groove-like recesses 56,58 are arranged in such a manner that the recess 58 is arranged between the two surface portions 60,62 of the inner corner surface 64 in the transition of the fastening portion 50 to the intermediate portion 46. The groove-like recess 56 is situated in the surface portion 66 of intermediate portion 46 on the outer side of the corner region 52 toward the fastening portion 48, notably substantially opposite the inner corner region 70. This inner corner region 70 is defined by two inner surface portions 72,74.

Alternatively to a thickness reduction of the material and optionally also in addition thereto, the flexible corner regions 52,54 can be realized by shortening the width of the support arms 40 in the corner regions 52,54.

The support arms 40 are suitably made of plastic. The extent of the lateral movements of the operating element 16 caused by the actuator 36 is so small that the plastic material will retain its elasticity in the corner regions 52,54, thus maintaining the restoring capability of the intermediate portions 46 with respect to the automatic adjustment in the direction of actuation 28.

As shown in FIGS. 5 and 6, the support arms can also be designed as substantially U-shaped support arms 40',40". In this arrangement, the recesses 56,58 are formed either in the inner corner regions or in the outer corner regions or in both regions or alternately in the inner corner region and the outer corner region.

LIST OF REFERENCE NUMERALS 10 operating unit
12 housing of operating unit
14 top side of housing
16 operating element
18 operating field of operating element
22 housing of operating element
24 support element
26 plate element made of spring steel
28 direction of actuation of operating element
30 sensor for detection of actuation of operating element
32 sensor elements of sensor
34 evaluation and drive unit
36 actuator
38 direction of (oscillatory) movement of operating element
40 support arms for support element
40' support arms for support element
40" support arms for support element
42 abutment element for support arms
44 bottom wall
46 intermediate portion
48 fastening portion of support arm
50 fastening portion of support arm
52 corner region of support arm
54 corner region of support arm
56 groove or groove-like recess in corner region of support arm
58 groove or groove-like recess in corner region of support arm
60 surface portions of corner region
62 surface portions of corner region
64 inner corner surface
66 surface portion of corner region
70 inner corner region
72 inner surface portion of corner region
74 inner surface portion of corner region

The invention claimed is:

1. An operating unit for an electrical appliance, comprising
    an operating element which can be pressed down in a direction of actuation,
    a support element which is mechanically coupled to the operating element and on which the operating element is elastically supported so as to be movable in the direction of actuation,
    a sensor for detecting a motion of the operating element when the operating element is pressed down, and/or for detecting a force applied to the operating element,
    an actuator for moving the operating element, and
    an evaluation and drive unit connected to the sensor and to the actuator for driving the actuator upon press-down movement of the operating element and/or application of force onto the operating element as detected by the sensor,
    the support element being adapted to be moved by the actuator in at least one direction of movement extending transversely to the direction of actuation of the operating element,
    wherein the support element is supported on at least two support arms which project upward from an abutment element and are arranged in an extension of the direction of actuation of the operating element, and
    wherein, for movement of the support element by the actuator, the support arms each have opposite ends respectively connected to the support element and the abutment element, and an intermediate portion elastically deflectable in said at least one direction of movement extending transversely to the direction of actuation of the operating element.

2. The operating unit according to claim 1, wherein the support element is designed as a resiliently elastic plate element.

3. The operating unit according to claim 1, wherein each support arm is of a Z-shaped or U-shaped design and comprises the intermediate portion arranged in the extension of the direction of actuation of the operating element, and two fastening portions each projecting from respective ends of the intermediate portion at a right angle thereto and, relative to each other, in identical or opposite senses, a respective one of the fastening portions being connected to the support element and the respective other one being connected to the abutment element, and that each support arm in a corner region between the intermediate portion and each of the fastening portions is of a flexible design effected by a reduced thickness and/or width relative to adjacent regions of the intermediate and fastening portions of the support arms.

4. The operating unit according to claim 3, wherein each corner region of a support arm comprises an inner surface and an outer surface, each of the inner and outer surfaces comprising respectively two mutually right-angled surface portions and that the inner surface and/or the outer surface comprises a groove-like recess and/or that a connecting region where the two surface portions of the inner surface and/or the two surface portions of the outer surface are bordering on each other, comprises a groove-like recess, wherein the groove-like recess is arranged on the inner surface or on the outer surface, or on the outer surface opposite to the connecting region of the inner surface.

5. The operating unit according to claim 3, wherein the support arms comprise plastic material.

6. The operating unit according to claim 1, wherein the sensor is a position sensor or force sensor operating in a capacitive, inductive, ohmic or optical manner.

7. The operating unit according to claim 1, wherein the actuator is in operative connection with the support element or the operating element.

8. The operating unit according to claim 1, wherein the sensor comprises at least two sensor elements for detection of an actuation of the operating element and/or of an application of force onto the operating element and that, in the evaluation and drive unit, a site of an application of force onto an operating surface of the operating element for pressing down the operating element can be detected on the basis of the signals delivered by the two sensor elements, or that the operating element comprises a touch-sensitive operating surface for detection of a site of a touch onto the operating element and/or of an application of force for pressing down the operating element.

9. The operating unit according to claim 1, comprising a damping unit for dampening the movement caused by the actuator when said movement is fading after deactivation of the actuator.

10. The operating unit according to claim 1, wherein the actuator is in operative connection, in a capacitive, inductive or mechanical manner, with the support element or the operating element.

\* \* \* \* \*